(12) United States Patent
Zahr et al.

(10) Patent No.: US 10,688,901 B2
(45) Date of Patent: Jun. 23, 2020

(54) INTERMEDIATE STORAGE VEHICLE FOR MILLED MATERIAL AND WORK TRAIN

(71) Applicant: BOMAG GmbH, Boppard (DE)

(72) Inventors: Thomas Zahr, Pulheim (DE); Rafael Schomaker, Lingen (DE); Andre Hoffmann, Gondershausen (DE); Andreas Nacke, Dessighofen (DE); Marco Reuter, Emmelshausen (DE)

(73) Assignee: BOMAG GmbH, Boppard (DE)

( * ) Notice: Subject to any disclaimer, the term of this patent is extended or adjusted under 35 U.S.C. 154(b) by 202 days.

(21) Appl. No.: 15/459,504

(22) Filed: Mar. 15, 2017

(65) Prior Publication Data

US 2017/0274812 A1 Sep. 28, 2017

(30) Foreign Application Priority Data

Mar. 23, 2016 (DE) .......................... 10 2016 003 561

(51) Int. Cl.
| | | |
|---|---|---|
| *B60P 1/36* | (2006.01) | |
| *E01C 23/12* | (2006.01) | |
| *E01C 23/088* | (2006.01) | |
| *B62D 55/06* | (2006.01) | |
| *B60P 1/38* | (2006.01) | |
| *B60P 1/64* | (2006.01) | |

(Continued)

(52) U.S. Cl.
CPC ............... *B60P 1/36* (2013.01); *B60P 1/38* (2013.01); *B60P 1/64* (2013.01); *B60R 11/04* (2013.01); *B62D 55/06* (2013.01); *B62D 55/084* (2013.01); *E01C 23/127* (2013.01); *E01C 23/088* (2013.01)

(58) Field of Classification Search
CPC .... B65G 41/00; B65G 41/001; B65G 41/002; B65G 41/005; B65G 41/007; B65G 41/008; B60P 1/36; B60P 1/42; E01C 23/088; E01C 23/127; B62D 33/0636; B62D 21/14; B62D 33/027
USPC .... 198/311, 312, 315, 316.1, 317, 318, 632; 414/503, 502, 505, 528, 345; 296/26.05, 296/26.13, 26.14, 26.15, 190.04; 280/425.1, 5.514, 6.157
See application file for complete search history.

(56) References Cited

U.S. PATENT DOCUMENTS 3,648,859 A * 3/1972 Johnson .................... B60P 1/36
298/24
3,874,530 A * 4/1975 Purdy ....................... B60G 5/02
414/526

(Continued)

FOREIGN PATENT DOCUMENTS

| CN | 102021878 A | 4/2011 |
|---|---|---|
| CN | 105735093 A | 7/2016 |

(Continued)

OTHER PUBLICATIONS

China National Intellectual Property Administration, Office Action, Chinese Patent Application No. 201710311200.2, dated Mar. 24, 2020 (21 pages).

*Primary Examiner* — David J Bagnell
*Assistant Examiner* — Michael A Goodwin
(74) *Attorney, Agent, or Firm* — Wood Herron & Evans LLP (57) ABSTRACT

The present invention relates to an intermediate storage vehicle for storing milled material and also to a work train with such an intermediate storage vehicle, a surface milling machine and a transport vehicle.

19 Claims, 6 Drawing Sheets

(51) Int. Cl.
*B60R 11/04* (2006.01)
*B62D 55/084* (2006.01)

(56) References Cited

U.S. PATENT DOCUMENTS

| | | | | |
|---|---|---|---|---|
| 4,874,283 | A * | 10/1989 | Hurley, Jr. | E01C 19/182 414/504 |
| 7,040,980 | B1 * | 5/2006 | Kestel | A01D 41/1217 414/345 |
| 2003/0161709 | A1 * | 8/2003 | Musso, Jr. | B60P 1/36 414/528 |
| 2006/0045621 | A1 | 3/2006 | Potts et al. | |
| 2009/0010743 | A1 * | 1/2009 | Wilz | B60P 1/36 414/339 |
| 2010/0290878 | A1 * | 11/2010 | Ricketts | A01D 90/105 414/505 |
| 2012/0027514 | A1 | 2/2012 | Hall | |
| 2012/0067692 | A1 * | 3/2012 | Forster | E01C 23/088 198/320 |
| 2013/0076101 | A1 * | 3/2013 | Simon | E01C 23/088 299/39.2 |
| 2013/0080000 | A1 * | 3/2013 | Von der Lippe | E01C 23/088 701/50 |
| 2013/0189032 | A1 | 7/2013 | Bellerose et al. | |
| 2014/0286739 | A1 * | 9/2014 | Helmsderfer | A01C 15/003 414/528 |
| 2015/0167261 | A1 | 6/2015 | Beming et al. | |
| 2016/0052731 | A1 * | 2/2016 | Berning | B65G 41/002 299/1.9 |
| 2016/0053448 | A1 * | 2/2016 | Berning | E01C 23/01 299/1.9 |
| 2016/0170415 | A1 | 6/2016 | Zahr | |
| 2017/0009408 | A1 * | 1/2017 | Marsolek | E01C 23/088 |
| 2017/0053220 | A1 * | 2/2017 | Marsolek | G06Q 10/0637 |
| 2017/0130405 | A1 * | 5/2017 | Engelmann | B60R 1/00 |

FOREIGN PATENT DOCUMENTS

| | | |
|---|---|---|
| DE | 102012012607 A1 | 1/2014 |
| DE | 102012022879 A1 | 2/2014 |

\* cited by examiner

INTERMEDIATE STORAGE VEHICLE FOR MILLED MATERIAL AND WORK TRAIN

CROSS-REFERENCE TO RELATED APPLICATION

The present application claims priority under 35 U.S.C. § 119 of German Patent Application No. 10 2016 003 561.7, filed Mar. 23, 2016, the disclosure of which is hereby incorporated herein by reference in its entirety.

FIELD OF THE INVENTION

The present invention relates to an intermediate storage vehicle for storing and transferring milled material as well as a work train for milling surface material at a particular milling depth.

BACKGROUND OF THE INVENTION

In roadway construction, in particular in the case of maintenance work on road surfaces, "surface milling machines" are often used for processing the road surface or the surface substrate. Such surface milling machines include, in particular, cold road milling machines such as those described in DE102012022879A1 and DE 102012012607A1, to which reference is made here. These surface milling machines mill the surface of the substrate to the desired milling depth using a milling drum, which results in the generation of milled material such as asphalt granulate. However, this milled material is often not intended to remain on site, but rather to be transported elsewhere. For this purpose, the surface milling machine usually has a conveying device with which the milled material generated during the milling process can be transferred to a transport vehicle, which is generally a transport truck such as a dump truck with a 16 ton load capacity. Depending on the alignment of the conveying device on the surface milling machine in relation to the working direction A, the transport vehicle typically either drives in front of or behind the surface milling machine. However, as the surface milling machine only moves very slowly in the working direction during the milling process, it is necessary for the driver of the transport vehicle alternately to drive a short distance forward and then wait until the surface milling machine has "caught up" with it again. The transport vehicle therefore does not move at an even speed, but rather moves back and forth relative to the surface milling machine. When the maximum load of the transport vehicle is reached, it must be replaced with another transport vehicle. This replacement procedure has the result that a transport vehicle is not available to receive the milled material for a significant amount of time. As the surface milling machine in continuous operation would continue to produce milled material, an undesirable downtime of the surface milling machine is the result. This situation is made even more acute when only one lane of the roadway is available for the entire working procedure, as is often the case with maintenance work on partially blocked highways with parallel traffic. This downtime of the surface milling machine means a substantial loss of productivity and thus substantial loss of profit, which can be particularly drastic in the case of long milling paths. Moreover, this procedure renders a complicated driving pattern necessary for the transport vehicle during loading, which demands a high level of concentration from both the driver of the surface milling machine as well as from the driver of the transport vehicle.

It is thus the object of the present invention to provide a way of improving the working operation of the surface milling machine.

SUMMARY OF THE INVENTION

One aspect of the present invention is to provide a drivable intermediate storage unit between the surface milling machine and the transport vehicle for the purpose of temporarily receiving milled material. In addition, in accordance with the present invention, the intermediate storage unit is able to transfer the collected milled material to one or more transport vehicles independently of the surface milling machine and independently of the ongoing milling and loading process. This way, the work of the surface milling machine can be decoupled from the coordination of the alternating transport vehicles, and the surface milling machine can operate continuously and independently of the process of loading the milled material onto the one or more transport vehicles.

According to one embodiment of the present invention, such an intermediate vehicle for storing and loading milled material includes a machine frame, a chassis, a milled material store, an internal conveying device and a load transfer conveyor, wherein the internal conveying device is configured to transport the milled material from the milled material store in the direction of the load transfer conveyor and the load transfer conveyor is configured to unload the milled material from the intermediate storage vehicle as well as in such a way that it preferably at least partially protrudes from the rest of the vehicle. The machine frame basically designates the supporting structure that is configured for supporting the chassis, the milled material store, etc. The machine frame can comprise one part or several parts. The chassis serves to ensure that the intermediate storage vehicle is drivable. The milled material store is a kind of receiving area configured for the temporary reception of milled material. The milled material store is thus preferably configured to be open at the top so that milled material can be discharged from the surface milling machine into the milled material store from above. In the simplest case, the milled material store is thus configured in a manner comparable to, e.g., a trough.

The internal conveying device is a conveying device for transporting milled material within the intermediate storage vehicle. This first conveying device enables, in particular, for emptying the milled material store, the transportation of milled material coming from the milled material store to the load transfer conveyor and/or the movement of the milled material within the milled material store.

A task of the load transfer conveyor, on the other hand, is to convey the milled material to a final unloading point, in particular, from the internal conveying device to a load transfer point to a transport vehicle. Finally, by means of the load transfer conveyor, the transfer of the milled material from the intermediate storage vehicle to a transport vehicle takes place.

This basic arrangement makes it possible to pursue the milling process continuously, even over long milling paths and/or at great milling depths, without an interruption of the milling operation due to a change of transport vehicles being necessary. As long as a transport vehicle is not available, the milled material arising during this interval can be held temporarily in the intermediate store of the intermediate storage vehicle and thus "buffered". An essentially continuous loading of the intermediate storage vehicle with milled material throughout the entire milling process is thus followed, viewed in the direction of material conveyance, by a non-continuous transfer of milled material from the intermediate storage vehicle to one or more transport vehicles. Interruptions of the milling process due to changing transport vehicles can thus be completely avoided.

In order for the transport vehicle to assume a suitable loading position relative to the intermediate storage vehicle, the load transfer conveyor is preferably configured at least partially protruding from the rest of the vehicle. This means that the load transfer conveyor, at least in its terminal or discharge area, protrudes over the rest of the intermediate storage vehicle, in particular, in the horizontal plane. This applies, in particular, to the sidewalls of the milled material store. This protruding configuration of at least a part of the load transfer conveyor thus creates a free space in which a transport vehicle can position itself near the intermediate storage vehicle for the purpose of transferring a load. In particular, the protruding configuration relates not only to a configuration that protrudes from the rest of the intermediate storage vehicle in the horizontal direction, but, in particular, also to a configuration of the load transfer conveyor that rises in the vertical direction. This way, the load transfer conveyor has an obliquely ascending configuration away from the rest of the intermediate storage vehicle, at least in a section.

The propulsion of the intermediate storage vehicle can be achieved in various ways. For example, it is possible for the intermediate storage vehicle to be moved in tandem with another vehicle such as the surface milling machine itself or a separate pulling or pushing vehicle. This can occur via a pulling or pushing connection, in particular via a pulling or pushing connection that keeps a particular distance between the intermediate storage vehicle and the other vehicle. It is, however, preferable that the intermediate storage vehicle is configured as a self-propelled vehicle with its own drive, in particular with a combustion engine. In an embodiment of the present invention, the intermediate storage vehicle thus includes a drive engine, which provides the drive power for the propulsion of the vehicle and, in particular, also for operating the internal conveying device and the load transfer conveyor. This allows a comparatively autonomous operation of the intermediate storage vehicle.

In order to be able to move in conjunction with the surface milling machine, the intermediate storage vehicle requires a chassis. Various alternatives can be used for the actual configuration of the chassis. The chassis can generally be, e.g., a wheeled chassis. However, it is preferred that the chassis be configured as a tracked chassis, in particular, comprising several crawler tracks. The crawler tracks can be arranged as required on the intermediate storage vehicle, for example, with two or more parallel tracks, or in a triangular constellation with the front track being arranged on the vertical longitudinal center plane of the surface milling machine. The number and positioning of the tracks can thus vary. However, in order to provide the intermediate storage vehicle with a stable stance, it is preferred that the tracks be arranged overall symmetrically in relation to a vertical longitudinal plane of the surface milling machine.

During operation of the intermediate storage vehicle, a chassis with a comparatively large track width can provide greater stability. In order to facilitate an easy transportation of the intermediate storage vehicles to the work site, the intermediate storage vehicle is preferably configured in such a way that it can be loaded onto a low-bed trailer. However, low-bed trailers have a standardized maximum loading width. It is possible in principle to configure the chassis of the intermediate storage vehicle with tracks close to the vertical longitudinal plane and, as described in more detail in the following, to configure the milled material store to have a variable width. It is preferred that the chassis of the intermediate storage vehicle be configured as a vehicle with an adjustable track width so that, for example, the distance of the tracks can be varied in relation to the vertical longitudinal plane of the surface milling machine. This way, in particular at least two different track width settings are rendered possible, for example, a relatively narrow transport track width and a comparatively wide working track width, i.e., so that the transport track width is narrower than the working track width.

In addition, or alternatively, it can also be provided that the chassis is configured to be height-adjustable. For this purpose, it can, e.g., be provided that at least one, but in particular two and especially all chassis, be configured to be height-adjustable, in pairs and/or individually, e.g., by attaching the chassis to the machine frame via vertically height-adjustable lifting columns, etc. This way, it is possible, on the one hand, to compensate for or at least reduce unevenness in the ground, e.g., in the sense of a pendulum function. On the other hand, the height positioning of the entire machine in relation to the surface milling machine and/or the transport vehicle can be varied. The height adjustment can be used as a supplement to or for the obtaining of a levelling function in order to compensate for unevenness in the ground so as to increase the stability of the intermediate storage vehicle.

Just as with the propulsion of the intermediate storage vehicle, the steering and/or guidance of the intermediate storage vehicle can also be implemented in multiple ways. For example, it is possible to forego an independent steering or guidance of the intermediate storage vehicle entirely if the intermediate storage vehicle is moved via a pulling or pushing connection. It is also possible for the intermediate storage vehicle to have a coupled steering or guidance system, in particular a mechanical one, which is linked to the steering or guidance system of another vehicle. It is particularly preferable, however, if the intermediate storage vehicle, in particular in addition to a self-propelled configuration, has its own steering or guidance system, in particular one that can be actuated by the machine operator using a control element arranged on the intermediate storage vehicle. On account of the often very limited maneuvering options available in construction site operation, it can also be provided that all propulsion devices are steerable.

A series of alternatives can also be utilized with regard to the operation of the intermediate storage vehicle according to one embodiment of the present invention. First, it is preferable that the intermediate storage vehicle have an operating platform from which the driving and/or working operations of the intermediate storage vehicles can be controlled by an operator. It is possible to position this operating platform, for example, at the rear end of the intermediate storage vehicle in relation to the working direction, at the left or right side of the intermediate storage vehicle in relation to the working direction, or, depending on the arrangement of the milled material store, even above or below the milled material store. However, it is preferable if the operating platform is positioned at the front side or the front end of the intermediate storage vehicle in relation to the working direction. This way, the machine operator has a wide and direct field of view with respect to a transport vehicle travelling ahead and in the direction of travel of the intermediate storage vehicle.

It is also preferable for the operating platform to be configured as a driver's cab in order to enable adequate protection of the driver, e.g., from the influences of the weather. The driver's cab itself or at least its roof is preferably adjustable between an operating position and a transport position, e.g., by folding, swiveling, turning down, sliding, etc. This allows the transport dimensions of the intermediate storage vehicles to be further optimized. The operating platform preferably also includes a Roll-Over Protective Structure (ROPS) and/or a protective structure against falling objects (Falling Object Protection Structure; FOPS).

In a further preferred embodiment, it is also provided that the operating platform is mounted in an adjustable manner in relation to the machine frame as a whole, in particular in the vertical and/or horizontal direction. The operating platform can thus assume various relative positions and thus be adapted to, e.g., the on-site conditions and/or different surface milling machines and/or different transport vehicles. It is often advantageous if the operator of the intermediate storage vehicle has a working position that is relatively high, e.g., in order to be able to look from above at the intermediate storage unit and/or at the transport vehicle and its loading surface. At the same time, the intermediate storage vehicle must also have a comparatively flat configuration, e.g., for passing under bridges. In such cases, it is thus preferable if the operating platform is configured to be vertically adjustable and if operation of the intermediate storage vehicle from the operating platform is also possible from various vertical positions of the operating platform. The same ultimately applies to a horizontal adjustment of the operating platform, e.g., when traversing comparatively narrow passages. Suitable rail guidance systems, joint couplings, etc., can be used for this purpose.

Also, the load transfer conveyor can be reducible in size, e.g., by folding down, pulling in, etc., with respect to the outer dimensions of the intermediate storage vehicle, in particular for transport purposes. The present invention also includes add-on and removable variants.

An element of the intermediate storage vehicle according to one embodiment of the present invention is the milled material store for the temporary holding of milled material. Its basic function is the receiving and storage of the milled material for the period of time from the loading by the surface milling machine to the unloading by means of the load transfer conveyor, it being expedient, but not necessary, for these two processes to run simultaneously. The milled material store can be optimized in various ways. A particularly reliable basic form is for the milled material store to have a floor and be open at the top. To this end, the receiving area of the milled material store is enclosed at the sides by corresponding sidewalls, in particular by fully surrounding walls. For example, the milled material store can have a rectangular layout and/or a funnel-shaped floor or a slanting floor. The sidewalls can also be completely or partially sloped and configured as a part of an overall funnel-like structure so that the horizontal cross-section surface of the milled material store at least partially diminishes from the top towards the bottom at the level of the sidewalls. This way, the milled material is concentrated at the bottom of the milled material store in a smaller surface area, which facilitates the further conveyance of the milled material via the internal conveying device.

To make it easier to transport the unloaded intermediate storage vehicle using a low-bed trailer and simultaneously allow a large-volume holding capacity, at least one sidewall can be configured as a swinging or sliding sidewall. In particular, the sidewall is configured to swivel or slide from a working position further extended in the horizontal plane inward to a less extended transport position. It is particularly expedient for the left sidewall of the milled material store in the working direction and/or the right side wall of the milled material store in the working direction to be configured to be swiveling and/or sliding sidewalls. This reduces the total width of the intermediate storage vehicle so that the most complication-free transport possible of the intermediate storage vehicle on a low-bed trailer is rendered possible. This simultaneously renders possible a comparatively high holding volume of the milled material store.

In addition, or alternatively, at least one and, in particular, all sidewalls of the milled material store can also be, at least partially, height-adjustable and thus have, e.g., a lower fixed wall and a height-adjustable adjustable wall (which can be folded or slided), which together both form a sidewall of the milled material store. The adjustable wall can be, e.g., moved down for transport purposes and then moved up again relative to the fixed wall for work purposes.

For practical usage, it has proven reliable to design the milled material store so that the load capacity of the milled material store is based on the load capacity of the transport vehicle used, in particular a conventional, bulk-material transporter approved for road use with an admissible transport load capacity of at least 5 t, in particular of at least 10 t and especially of at least 15 t. According to a design that has proven itself particularly advantageous, the milled material store is designed to receive at least 1.5 times this load capacity, i.e., for receiving at least 7.5 t, in particular at least 15 t and especially at least 22.5 t. In any case, it is preferable for the load capacity of the milled material store to exceed the load capacity of the transport vehicle. Particularly, smooth work processes are obtained when the maximum load capacity of the milled material store exceeds the load capacity of the transport vehicle by at least two times and ideally by at least two and a half times. The limits here are usually set by the necessary dimensions and/or the weight of the intermediate storage vehicle with regard to the transportation of the intermediate storage vehicle. It is also preferred that the maximum weight of the loaded intermediate storage vehicle should not exceed 36 t.

It is also preferred that the maximum width of the intermediate storage vehicle correspond to 2.5 m, this specification relating to the transport state of the intermediate storage vehicle (i.e., if possible, with, e.g., retracted side walls and/or retracted track adjustment system, retracted load transfer devices, etc.). In addition, or alternatively, the intermediate storage vehicle is ideally configured in such a way that it maximum height, in particular in the transport state, does not exceed 4 m.

In order to allow the receiving and unloading of the milled material from the milled material store independently vis-à-vis the milling process, it is necessary that the intermediate storage vehicle comprise devices with which the milled material can be moved from the milled material store and/or be transferred to a transport vehicle. An essential element for this purpose is the internal conveying device in accordance with the present invention. The essential task of the internal conveying device is to move the milled material within the intermediate storage vehicle. As the intermediate storage vehicle preferably maintains a constant distance to the surface milling machine, it can occur, for example, that, during the loading of the milled material store, the milled material is always deposited at approximately the same position within the milled material store. The milled material is thus not necessarily distributed evenly in the milled material store, but rather piles up at a certain point. It also cannot be assumed that the milled material can be picked up by the load transfer conveyor at the discharge position. The task of the internal conveying device is thus to convey the milled material further within the milled material store and/or to distribute it. Ideally, the internal conveying device is configured in such a way that it conveys the milled material from the milled material store in the direction of the load transfer conveyor. This does not necessarily mean that the internal conveying device conveys the milled material out of the milled material store, although this is a variant covered by the present invention. However, it is preferred that the internal conveying device be configured to transfer the milled material onto the load transfer conveyor. Depending on the arrangement of the load transfer conveyor, a transfer opening can also be provided in a sidewall of the milled material store to which the milled material is conveyed by the internal conveying device. Additionally, or alternatively, it is also possible that the internal conveying device be provided essentially or even exclusively for distribution and/or conveyance of the milled material within the milled material store. This can be advantageous, in particular, when the milled material store has a relatively large receiving volume and, e.g., a local pile-up of large amounts of milled material within the milled material store can have a negative influence on the stability of the intermediate storage vehicle.

It is also preferred that the internal conveying device be configured to be controllable, in particular independently of the transfer conveyance device described in more detail below, for example, with a programmable logic controller (PLC) or via a connection to a more comprehensive control system of the intermediate storage vehicle. Functions in which the internal conveying device can preferably be controlled include, e.g., the starting and stopping of conveyance, the interruption of conveyance, and the variation of conveyance speed and direction.

If the milled material is to be moved within the milled material store by the internal conveying device, the internal conveying device is preferably at least partially arranged in the milled material store or integrated into it, the use of different variants being possible here as well. For example, the internal conveying device can be arranged on the sidewalls of the milled material store. However, as the load transfer conveyor is preferably located at the front end of the milled material store, the internal conveying device is arranged, in particular, parallel to the longitudinal center axis of the milled material store. It has also proven particularly preferable that the internal conveying device be arranged on the floor or loading surface of the milled material store. Alternatively, a trapdoor is provided in the floor of the milled material store through which the milled material falls into the internal conveying device arranged at least partially beneath the floor, for example, in a conveyor shaft/channel.

In one embodiment, the internal conveying device is basically arranged completely in or below a funnel-shaped depression of the floor of the intermediate storage unit. The funnel-shaped configuration of the floor then slides the milled material in the intermediate storage unit essentially autonomously into the internal conveying device so that, e.g., an almost perfectly complete unloading of the intermediate storage unit by the internal conveying device is rendered possible.

Regardless of the arrangement of the internal conveying device, different conveyance technologies can be utilized in the design of the internal conveying device itself. The internal conveying device is preferably configured as a scraping conveyor, worm conveyor, belt conveyor, or chain conveyor.

In addition to the internal conveying device, the intermediate storage vehicle according to one embodiment of the present invention comprises the load transfer conveyor. The essential task of the load transfer conveyor is to transfer the milled material from the intermediate storage vehicle onto a transport vehicle. Such a transport vehicle is usually one with a load receptacle open at the top, for example, a dump truck. The load transfer conveyor is thus preferably configured in such a way that the milled material is discharged at a discharge point that is above the upper edge of the receptacle of the transport vehicle. For example, it can be provided that the load transfer conveyor unloads the milled material from the milled material store in an ascending manner over a sidewall of the milled material store. As an alternative to conveying the milled material over the sidewalls of the milled material store, an arrangement is also possible according to which a load transfer opening is present in a side wall of the milled material store and the load transfer conveyor conveys the milled material through this load transfer opening or receives it directly after its passage through the load transfer opening.

In principle, the load transfer device can be an autonomous unit that is completely independent of the internal conveying device both with regard to its structural configuration as well as with regard to its control. This is advantageous inasmuch as the individual design of both the internal conveying device and the load transfer conveyor is made simpler and in that the milled material movement within the milled material store is clearly functionally separated from the transfer of the milled material. However, it is also possible and included in the present invention to configure the internal conveying device and the load transfer conveyor as one module, wherein the part of the module that essentially effects a conveyance of the milled material within the milled material store corresponds to the internal conveying device and the part of the module that essentially serves to transfer and, in particular, discharge the milled material in the transport vehicle corresponds to the load transfer conveyor. This can also include embodiments according to which the internal conveying device and the load transfer conveyor have a common means of conveyance, for example, a common transport belt.

Various conveyance technologies can also be utilized for the specific configuration of the load transfer conveyor. For example, the load transfer conveyor can be configured as a worm conveyor, a belt conveyor or a chain conveyor. It has proven especially preferable if the load transfer conveyor is configured as a scraping conveyor, for example, a scraping belt conveyor or a scraping chain conveyor. Due to the material properties of the milled material, pneumatic conveyors are unsuitable for both the internal conveying device and the load transfer conveyor.

It is preferred that the load transfer conveyor be configured to be controllable, for example, using a programmable logic controller (PLC) or a connection to a more comprehensive control system. In particular, as part of a control system, the load transfer conveyor can be switched on and off, operation of the load transfer conveyor can be interrupted, and/or the conveyance speed of the load transfer conveyor can be varied. Here, the load transfer conveyor is preferably controllable in such a way that the control system and its operations can be operated independently of a control system or operations of the internal conveying device. For example, the internal conveying device can be operated while the load transfer conveyor is at rest. The power for driving the load transfer conveyor can still be obtained from a secondary drive of the propulsion engine or an auxiliary drive.

In order to enable the intermediate storage vehicle to work as well as possible together with a wide spectrum of different transport vehicles during working operation and in order to achieve greater flexibility in the positioning of the transport vehicle and the intermediate storage vehicle in relation to one other, the load transfer conveyor is preferably configured so that the point of discharge can be varied. This variation of the point of discharge can relate to various directions or degrees of freedom and can be implemented in various ways. For example, the load transfer conveyor, at least with regard to its point of discharge, is preferably configured to be height-adjustable. In other words, it is preferable to provide the load transfer conveyor with a height-adjustment device. This can occur, e.g., by means of a mounting of the load transfer conveyor in a swivel-articulated fashion with a horizontal swivel axis. A further possibility for adjusting the load transfer conveyor can, additionally, or alternatively, preferably be provided by means of a load transfer conveyor that can be swiveled, for example, to the sides from a central position, so that the lateral deflection of the point of discharge can be varied. This is particularly relevant if, for example, the intermediate storage vehicle and the transport vehicle are not precisely aligned in relation to one other, but rather must travel on offset paths. This can be used advantageously to allow the transport vehicle and the intermediate storage vehicle to travel on offset paths during the load transfer process and thus avoid interrupting the load transfer process. Furthermore, it is especially preferred that the conveyance speed of the load transfer conveyor be controllable in order to allow, in particular, the discharge range of the load transfer conveyor to be varied. The discharge range of the load transfer conveyor here results from its position and the conveyance speed as well as the height difference in relation to the target surface of the loading procedure, for example, the floor of the load receptacle of the transport vehicle, and the consistency of the milled material. The variable discharge range can be used here to improve the process of loading the transport vehicle without having to constantly vary the distance between the transport vehicle and the intermediate storage vehicle. It is particularly preferred for all of said possibilities for variation of the point of discharge that these can be controlled be means of the control system described above for the load transfer conveyor and implemented using appropriate actuators.

In order to be able to convey the milled material from the milled material store, the load transfer conveyor is preferably arranged in such a way that at least a part of the load transfer conveyor protrudes over an edge of the milled material store. Preferably, the load transfer conveyor has a receiving end and a discharge end, and the receiving end of the load transfer conveyor is arranged in the milled material store while the discharge end protrudes beyond it. In other words, e.g., the discharge end of the load transfer conveyor is arranged higher than the upper edge of a sidewall of the milled material store. This way, the milled material can fall off the discharge end of load transfer conveyor even at slow milling speeds and exits the milled material store reliably. It has been proven to be particularly beneficial to arrange the load transfer conveyor with its receiving end at one end the milled material store. This allows a particularly effective cooperation of the internal conveying device and the load transfer conveyor, the internal conveying device conveying the milled material to one end of the milled material store, where it is then received by the load transfer conveyor. In order, on the one hand, to render possible that the load transfer conveyor is arranged with it receiving end at an end of the milled material store and, on the other hand, to create sufficient space for the load transfer conveyor, the load transfer conveyor is particularly preferably configured as a projection in structural union with a sidewall of the milled material store.

In relation to the milled material store, the load transfer conveyor can in principle be oriented in any direction: the specific arrangement is determined by the demands at hand and, in particular, the preferred relative position of the transport vehicle. For example, the load transfer conveyor can be arranged on the left side of the milled material store in the working direction or on the right side of the milled material store in the working direction if the transport vehicle and intermediate storage vehicle are driving next to one other or on offset paths. Another possibility is the arrangement of the load transfer conveyor on a rear side of the milled material store in the working direction. However, the load transfer conveyor is, in particular, configured on a front side of the intermediate storage vehicle, wherein the load transfer conveyor is preferably oriented in the working direction when viewed from the milled material store and the point of discharge of the load transfer conveyor is situated in front of the milled material store in the working direction. In the case of an elongated and rectangular design of the milled material store (in plan view), the end of the milled material store on which the load transfer conveyor is arranged is, in particular, a short side of the milled material store. If the load transfer conveyor can unload the milled material in the working or forward direction of the intermediate storage vehicle, the transport vehicle can also be positioned in front of the intermediate storage vehicle and the following surface milling machine. This way, the three vehicles driving in a row only take up a comparatively limited surrounding width. Moreover, the intermediate storage vehicle and the transport vehicle can frequently be moved on a surface with an increased bearing strength that has yet to be milled.

Furthermore, the load transfer conveyor can also be a part of a loading station of the intermediate storage vehicle. In the present case, a loading station refers to an installation under which a transport vehicle can drive and which clearly covers the load receptacle of the transport vehicle when viewed from above, preferably extending over at least 80% of the length of the transport receptacle in the forward direction. The loading station is preferably configured along the same longitudinal axis as the intermediate storage vehicle and thus, in a sense, represents an elongation of the intermediate storage vehicle, particularly in the working direction. For stabilization, the loading station may comprise, e.g., additional travel units, such as wheels or crawler tracks. The load transfer conveyor is preferably at least partially integrated in the loading station. In this connection, the loading station can be configured in such a way that a discharge of the milled material at different points of discharge along the longitudinal extension of the loading station is rendered possible. The loading station can be solidly integrated into the intermediate storage vehicle as well as configured as a removable module, which can be connected to or disconnected from the intermediate storage vehicle in a simple manner, as needed. The loading station can also comprise a further intermediate store so that a quick loading of the transport vehicle is rendered possible.

An additional alternative embodiment of the present invention provides that the milled material store is mounted in a rotatable manner. In this connection, in particular the milled material store, the internal conveyor and the load transfer conveyor are collectively mounted in a rotatable fashion about a vertical axis of rotation, the rotatability being, in particular, in relation to the chassis. It has proven preferable that the axis of rotation of the milled material store essentially passes through the center of mass of an unloaded or evenly loaded milled material store. Furthermore, the rotatable milled material store is configured with an essentially symmetrical area vis-à-vis a plane in which the axis of rotation lies. A rotatable mounting of the milled material store together with both conveying devices has the advantage that the intermediate storage vehicle can be adapted in a very simple manner to different operational constellations, i.e., to relative positions of the surface milling machine, intermediate storage vehicle and transport vehicle.

In order to make the load transfer process even more flexible, it can additionally, or alternatively, also be provided that more than one load transfer conveyor is arranged on the intermediate storage vehicle, wherein the individual load transfer conveyors, in particular, facilitate a load transfer on different sides of the intermediate storage vehicle or on the same sides of the intermediate storage vehicle, wherein the latter also enables multiple transport vehicles to drive simultaneously one in front of the other on one side of the intermediate storage vehicle and even to be simultaneously loaded. It is therefore ideal if the intermediate storage vehicle has at least two load transfer conveyors, which enable a simultaneous load transfer to the front and to the rear, in particular obliquely to the front and obliquely to the rear, especially on the same side of the intermediate storage vehicle. In this context, the indications "to the front", "to the rear", and "obliquely" refer to a horizontal reference plane and the direction of movement of the intermediate storage vehicle.

For practical working processes, the implementation of a control unit on the intermediate storage vehicle, via which a propelled operation of the intermediate storage vehicle and/or the operation of the internal conveyor and/or the operation of the load transfer conveyor is/are possible, in particular also from a central point, e.g., from the operator's platform, has proven preferable.

In particular, if the intermediate storage vehicle is to be unloaded, maneuvered, and/or is working together with a surface milling machine in a work train, it is preferable if the intermediate storage vehicle can be operated via a remote control or from outside the intermediate storage vehicle, in particular with respect to its steering, its travel speed, the operation of the internal conveying device, and/or the operation of the load transfer conveyor. For this purpose, a suitable receiver is provided on the intermediate storage vehicle, via which control commands from a mobile unit and/or from another vehicle, via a cable connection or wirelessly, can be received by the intermediate storage vehicle and transferred to the control unit. Especially, the surface milling machine should be considered for sending the control signals, as the surface milling machine is the primary work machine of the work train and the vehicle in relation to which the other vehicles must be oriented. The control signals here comprise, in particular, signals for controlling the speed or the direction of the intermediate storage vehicle and can either be manually generated, e.g., with an input device, or automatically, e.g., by means of a program running on a computer as part of an assistance system, e.g., a distance control. This type of remote steering device for the intermediate storage vehicle makes particular sense if the intermediate storage vehicle has its own means of propulsion, but does not comprise an operating platform. Moreover, a remote steering device may also be comprised in addition to an operating platform so that several alternative methods are available for controlling the intermediate storage vehicle. The remote steering device can be configured as an autonomous system or, if available, as part of the control system.

In order to simplify the operation of the intermediate storage vehicle, it can be additionally, or alternatively, provided that the latter comprises an external operating console for entering directional and/or speed and/or work commands. Thus, an external operating console refers to an input device via which an operator standing next to the intermediate storage vehicle can enter commands for operating the intermediate storage vehicle. This external operating console is particularly preferably arranged on at least one of the longitudinal sides of the intermediate storage vehicle.

In particular, the control system can be used for adapting the motion of the intermediate storage vehicle automatically to the motion of the surface milling machine so as to prevent or preclude, in particular, a collision of both vehicles. This can be done, for example, by adapting the direction or speed, in particular, of the intermediate storage vehicle to the surface milling machine. The control system can also be used within the framework of an assistance system for warning the driver of the intermediate storage vehicle or construction machine in case both vehicles move in relation to one another in such a way that the operation of the work train is affected adversely. This may occur, for example, if both vehicles move too far away from one another, come too close to one another or if they move at a wrong angle relative to one another. In particular, the relative positions of the surface milling machine and the intermediate storage vehicle are relevant for the automatic generation of control signals for the intermediate storage vehicle or warnings for the machine operator. It has thus been proven to be particularly preferable that the control system monitor, control and/or regulate the relative positions of the surface milling machine and the intermediate storage vehicle.

Alternatively, or in addition to the control, regulation or monitoring of the relative positions, the control system can generally also be designed for the automatic control or regulation of a distance between the surface milling machine and the intermediate storage vehicle. The specified distance can be any chosen distance between the surface milling machine and the intermediate storage vehicle, e.g., the smallest distance between both vehicles or the distance between a sensor on one of the vehicles and a distinctive feature on the other vehicle that can be reliably identified by this sensor. This control or regulation occurs here, in particular, in such a manner that the selected distance remains constant or, alternatively, the distance lies within a defined range.

If the control system is used to coordinate the motion of the intermediate storage vehicle with the motion of the surface milling machine, the control or regulation of the speed of the intermediate storage vehicle becomes particularly important. The speed of the entire work train is dictated by the working speed of the surface milling machine, which is typically considerably lower than the maximum speed of the other vehicles in the work train. Another preferred embodiment thus provides that the control system is configured to adapt the speed of the intermediate storage vehicle to the working speed of the surface milling machine.

The control system can preferably be used to control the load transfer process itself. As described above, in work trains known in the state of the art the coordination of a transport vehicle with a surface milling machine during the transfer of the milled material from the surface milling machine to the transport vehicle frequently requires a high level of attention by the driver of the transport vehicle, who must constantly vary the distance to the surface milling machine in order to spread the milled material evenly across the length of the transport container. The milled material can in principle also be transferred this way from the intermediate storage vehicle to the transport vehicle in a work train in accordance with the present invention. In order to alleviate the burden on the driver of the transport vehicle, however, it is preferable to configure the control system to control the position of the discharge point of the load transfer conveyor of the intermediate storage vehicle relative to the position of the transport container of the transport vehicle during the load transfer process in such a way that a previously determined, defined target distribution of the milled material in the transport container of the transport vehicle or a previously defined target surface geometry of the milled material in the transport container of the transport vehicle is at least approximately achieved. This type of control of the load transfer process can be implemented well, in particular, when the discharge range of the load transfer conveyor can be varied.

In addition, the control system can preferably be used to provide an automatic safety stop for the load transfer process. In other words, the control system can preferably be used to stop the operation of the load transfer conveyor automatically if there is no transport vehicle ready for receiving the milled material in a hypothetical loading area. This can include that the control system automatically interrupts or terminates the load transfer process if a previously defined maximum fill level of the transport vehicle has been reached. Conversely, the control system can also be used to resume the operation of the load transfer conveyor or to start the load transfer process if a there is a transport vehicle within the loading area, in particular a transport vehicle with a sufficient load capacity.

To perform the tasks and functions described above, the control system preferably comprises at least one sensor arrangement. Which sensors are used in the sensor arrangement depends here, in particular, on the details of the respective functionality to be provided; the use of a large range of different sensor technologies is thus conceivable. For example, the sensor arrangement can comprise an incline sensor or a distance sensor. However, it has been proven particularly preferable that the sensor arrangement comprises at least one camera. The sensor arrangement here, however, is not dependent on any particular type of camera, but rather the type of camera can be chosen by a person skilled in the art, as needed. For example, the sensor arrangement can comprise a 3-D camera or a color camera. The advantage of using one or more cameras in a sensor arrangement lies in the fact cameras are extremely versatile sensors, which in combination with an image-processing program can perform a number of different tasks.

These tasks, which the sensor arrangement helps perform, include, in particular, the determination of different distances between or relative positions of the transport vehicle, intermediate storage vehicle, surface milling machine or parts of these vehicles.

Thus, for example, the sensor arrangement is preferably configured to determine a distance between the intermediate storage vehicle and the surface milling machine and/or the transport vehicle, in particular in the horizontal direction. The distance determined in this manner can be used by means of the control system to regulate the distance between the intermediate storage vehicle and the surface milling machine to a target distance so that the intermediate storage vehicle always drives at a constant distance from the surface milling machine and adapts to its motion.

The determination of the relative position of the vehicles represents an alternative to determining their distances in the work train. Thus, it is preferred that the sensor arrangement is configured for determining the position of the intermediate storage vehicle in relation to the surface milling machine or in relation to the transport vehicle. This determination of position occurs, in particular, so that the determined position can be subsequently used for generating control signals for the intermediate storage vehicle, e.g., signals for controlling the speed or the direction of the intermediate storage vehicle. In addition to the use of cameras and image-processing programs, sensors with transit-time measurement capabilities, for example, laser range finders, are particularly suitable for determining distances or relative positions.

Potential functions of the sensor arrangement also relate, in particular, to the transport container of the transport vehicle, the position and fill level of which are relevant for the control of the load transfer process, in particular the load transfer conveyor. For this purpose, the sensor arrangement is, in particular, configured to determine the position of the transport container of the transport vehicle in relation to a discharge point of the load transfer conveyor of the intermediate storage vehicle. For example, the position of the transport container determined in this manner can then be used in the way described above to control the position of the discharge point or the discharge range of the load transfer conveyor or to stop the operation of the load transfer conveyor if the transport container of the transport vehicle is in a position in which a transfer of the milled material is not possible.

Another important parameter for controlling the load transfer process is additionally, or alternatively, the fill level of the transport container into which the milled material is transferred. It is thus preferred that the sensor arrangement be configured to determine the fill level of the transport container of the transport vehicle. The fill level of the transport vehicle determined in this manner can be used, for example, to start or stop the load transfer process from the intermediate storage vehicle to the transport vehicle, as described above, as a function of the fill level of the transport vehicle. In addition to the determination of the fill level, it has also proven expedient to configure the sensor arrangement to determine a distribution of the milled material in the transport container of the transport vehicle or a surface geometry of the milled material in the transport container of the transport vehicle. A determination of the distribution of the milled material within the transport container or the surface geometry of the milled material in the transport container is particularly expedient if the distribution or surface geometry determined in this manner is subsequently used to control the load transfer process in such a way that a desired distribution of the milled material in the transport container, e.g., a distribution that is as even as possible, is achieved.

It can also be provided that the intermediate storage vehicle has a pushing device in the forward direction, with which it can push a transport vehicle in front of it, in particular during the load transfer process. It is thus provided in this embodiment that a controlled collision is brought about between the intermediate storage vehicle and the transport vehicle and that the forward motion of the transport vehicle, at least during the load transfer, is realized by the pushing of the intermediate storage vehicle. Such a pushing device can comprise, in particular, e.g., push rollers or comparable devices. This embodiment has the advantage that it is not necessary to move the transport vehicle at a speed corresponding to the comparatively low speed of the intermediate storage vehicle and/or the surface milling machine. This generally otherwise represents a considerable strain on the drive train of the transport vehicle, in particular on coupling components. Moreover, the burden on the driver of the transport vehicle is alleviated, at least during the load transfer process.

Finally, an additional significant aspect of the present invention also lies in a work train for milling ground material at a milling depth. According to one embodiment of the present invention, the work train comprises a, in particular self-propelled, surface milling machine with a milling device and a conveying device for transferring the milled material milled by the milling device, at least a self-propelled transport vehicle comprising a transport container and with which the milled material is transported away, and an autonomous (vis-à-vis the surface milling machine), in particular self-propelled, intermediate storage vehicle, as already described above. Reference is accordingly made to the descriptions above.

The intermediate storage vehicle of the work train according to one embodiment of the present invention is loaded via a conveying device by the surface milling machine and, in turn, transfers the milled material to the transport vehicle. The work train has the essential advantage that the milling process can be continuously advanced and downtimes that were previously necessary for changing the transport vehicle are eliminated. Rather, the intermediate storage vehicle according to one embodiment of the present invention provides a material buffer that segments the essentially continuous loading process of the intermediate storage vehicle with milled material coming from the surface milling machine into a discontinuous loading process of the at least one transport vehicle. The buffer effect of the intermediate storage vehicle according to one embodiment of the present invention thus consists in its capacity to temporarily receive, collect and transfer the continuously generated milled material onto a transport vehicle.

Accordingly, a work train with a control system, as specified above in relation to the intermediate storage vehicle, is also comprised by the present invention. Individual elements of the control system can also be disposed on the surface milling machine and/or the transport vehicle here. In particular, the present invention thus also relates to a work train comprising a control system, which controls, regulates or monitors the positions of the surface milling machine and the intermediate storage vehicle relative to one another. The control system here is preferably configured to automatically control or regulate a distance between the surface milling machine and the intermediate storage vehicle, in particular in such a way that this distance remains largely constant or is at least within a defined range. The control system is additionally, or alternatively, configured to adapt the speed of the intermediate storage vehicle to the working efficiency of the surface milling machine and/or to control the position of the point of discharge of the load transfer conveyor of the intermediate storage vehicle relative to the position of the transport container of the transport vehicle during a load transfer process, in particular in such a way that a previously defined target distribution of the milled material into the transport container of the transport vehicle or a previously defined target surface geometry of the milled material in the transport container of the transport vehicle is at least approximately achieved.

The control system integrated in the work train here can comprise a sensor arrangement that comprises, in particular, at least one distance sensor and/or a camera and/or is configured to determine a distance between the intermediate storage vehicle and the surface milling machine or the transport vehicle. In addition, or alternatively, the sensor arrangement can be configured to determine the position of the intermediate storage vehicle relative to the surface milling machine or relative to the transport vehicle. It is also possible to configure the sensor arrangement for determining the position of the transport container of the transport vehicle relative to a discharge point of the load transfer conveyor of the intermediate storage vehicle and/or for determining a fill level of the transport container of the transport vehicle and/or for determining a distribution of the milled material in the transport container of the transport vehicle or a surface geometry of the milled material in the transport container of the transport vehicle.

BRIEF DESCRIPTION OF THE DRAWINGS

The present invention will be described in further detail below by means of the embodiments shown in the figures, which show schematically.

Identical components are indicated in the figures with the same reference signs, although components recurring in the figures do not always necessarily have to be designated separately.

DETAILED DESCRIPTION OF THE INVENTION

Figure 1:
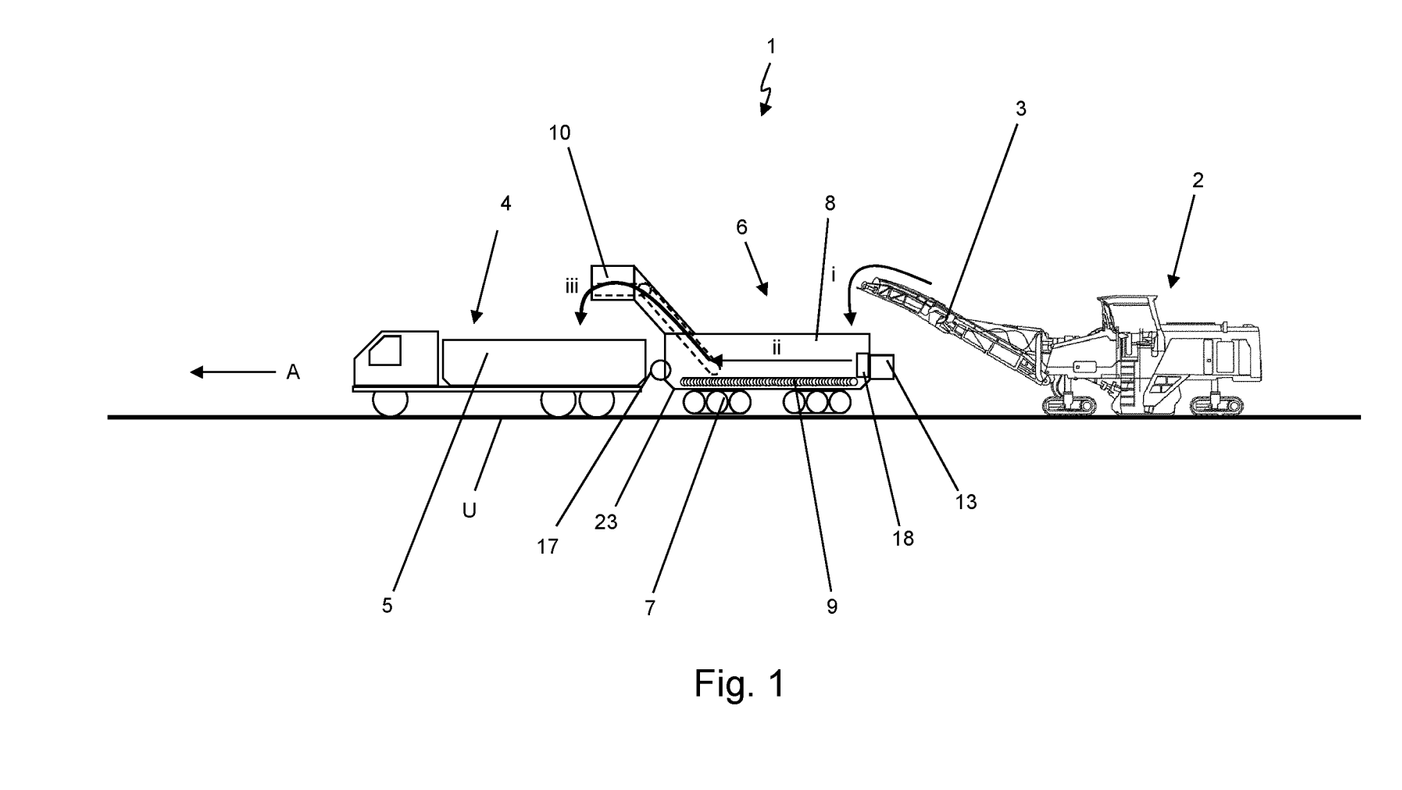
FIG. 1 is a side view of a work train in accordance with the present invention, with a transport vehicle, an intermediate storage vehicle and a surface milling machine.

FIG. 1 shows a schematic side view of a work train 1 according to one embodiment of the present invention conducting, e.g., road maintenance work. Among other things, the work train comprises a surface milling machine 2 of an essentially known design. It moves forward on crawler tracks in a working direction A of the work train 1 and mills with its primary working tool, the milling drum arranged in a known manner within a milling drum housing, the road surface it drives over, which forms the surface of the subgrade U. This milling process gives rise to milled material, which can be utilized e.g. for making new road surface material or discarded. The milled material, or at least a portion thereof, should thus be initially gathered from the subgrade surface and transported away from the construction site.

In order to enable as well as to simplify the removal of the milled material, the work train 1 also comprises, in addition to the surface milling machine 2, an intermediate storage vehicle 6 and at least one transport vehicle 4. When viewed in the working direction A, the intermediate storage vehicle 6 drives in front of the surface milling machine 2 and the transport vehicle 4 drives in front of the intermediate storage vehicle 6. It is essential here that several transport vehicles 4 can naturally also be alternately positioned in front of the intermediate storage vehicle 6. Thus, the transport vehicle 4 may in fact be several alternating transport vehicles 4, which successively take on the same position and function in the work train 1. It is also essential that in the work train 1 the surface milling machine 2 and the intermediate storage vehicle 6 move in the working direction A more or less evenly during the work process, while the transport vehicle/transport vehicles 4 position themselves alternately in front of the intermediate storage vehicle 6 and drive off once loading is completed.

Elements of the intermediate storage vehicle 6 are the chassis 7 (crawler tracks or wheels), a milled material store 8 largely configured as a trough, an internal conveying device 9 as well as a load transfer conveyor 10. In this specific embodiment, the intermediate storage vehicle 6 is also configured with its own propulsion engine 13 arranged in the rear and can thus move in the working direction A by means of its own power and drive. A machine frame 23 forms the essential supporting structure of the intermediate storage vehicle 6. FIG. 1 illustrates that the internal conveying device 9 is essentially arranged within the milled material store 8. Thus, it is, in particular, possible to convey milled material within the milled material store 8 from the rear area to the front area or in the working direction A with the internal conveyor 9.

In contrast, the load transfer conveyor 10 extends from the front area of the milled material store 8 forward in the working direction A and rises in the vertical direction beyond the milled material store 8 in an overhanging manner and thus protrudes in the horizontal as well as in the vertical direction. It is thus possible with the load transfer conveyor 10 to convey milled material delivered, e.g., by means of an internal conveying device 9 forward and upward in the working direction A out of the milled material store 8. Due to the fact that the load transfer conveyor 10 extends from the intermediate storage vehicle 6 in an overhanging manner, it is possible to maneuver the transport vehicle so that its back end is below the load transfer conveyor 10 in the manner shown in FIG. 1. The milled material is thus transported by the load transfer conveyor 10 in the direction of the arrow iii and discharged into a transport container/load receptacle 5 of the transport vehicle/dump truck 4 at an end located in the front in the direction of conveyance.

One aspect of the present invention is the handling of the milled material arising during the work process within the work train 1. The milled material is first generated and collected by the surface milling machine 2 and transferred via the conveying device 3 of the surface milling machine 2, a belt conveyor in this specific embodiment, to the intermediate storage vehicle 6 (arrow i in FIG. 1). The milled material here is discharged from the end of the conveying device 3 on the surface milling machine 2 and received by the milled material store 8 on the intermediate storage vehicle 6. The internal conveying device 9 arranged on the floor of the milled material store 8 then conveys (arrow ii) the milled material forward in the working direction A within the milled material store 8 until it reaches the receiving end of the load transfer conveyor 10. It is received there by the load transfer conveyor 10 and conveyed over the edge of the milled material store 8 to the discharging end of the load transfer conveyor 10. The milled material is discharged from the discharging end (arrow iii) and received by the transport container 5, here a loading bed, of the transport vehicle 4.

If the receiving capacity of the transport container 5 has been exhausted, the load transfer conveyor 10 is stopped. The transport vehicle 4 drives off, forward in the working direction A, and is replaced shortly thereafter by a new transport vehicle 4 ready for receiving. Regardless of all this, the surface milling machine 2 meanwhile continues its work and thus produces more milled material more or less continuously. The latter now accumulates in the milled material store 8 of the intermediate storage vehicle 6. If a transport vehicle 5 that is ready for receiving has arrived, the internal conveyor 9 and/or the load transfer conveyor 10 also resume their work. The milled material that has accumulated in the milled material store 8 is now transferred together with the newly milled material onto the transport vehicle 3. During this entire process, the surface milling machine 2 and the intermediate storage vehicle 6 essentially move evenly in the working direction A.

It is particularly beneficial if the load transfer conveyor 10 is capable of conveying a larger volume flow of milled material per unit of time than the conveying device 3 of the surface milling machine 2, as this way, even during the continuous operation of surface milling machine 2, the milled material store 8 can ideally be emptied to the greatest extent possible after each change of the transport vehicle 3. Otherwise, the milled material store 8 will be filled slightly more at each changing of the transport vehicle 3 so that at some point the receiving capacity of the milled material store 8 will also be exhausted.

The intermediate storage vehicle 6 of FIG. 1 further comprises a pushing device 17 in the front area of the machine frame 23, specifically in the form of a pair of push rollers. Thus, if the transport vehicle 4 approaches the intermediate storage vehicle 6, a controlled collision between both vehicles will be brought about in accordance with this embodiment. The propulsion engine 13 of the intermediate storage vehicle 6 is accordingly dimensioned so that it has sufficient capacities in terms of power in order to push the transport vehicle 4 in the working direction A during the load transfer process. For the driver of the transport vehicle 4, this embodiment has the advantage that he does not have to control the relatively slow speed of the remaining work train 1 during the load transfer process or keep his vehicle within a certain range of the intermediate storage vehicle 6 in a stop-and-go operation. In order to cushion the collision efficiently, it is expedient to design the pushing device 17 in a cushioned configuration, e.g., by means of suitable cushioning elements or other obvious alternatives.

For entering driving and/or load transfer commands, the intermediate storage vehicle 6 also comprises a lateral operating console 18 arranged in the rear area of the intermediate storage vehicle 6. Specifically, the lateral operating console 18 is thus an input device using, e.g., switches and/or levers, by means of which an operation of the intermediate storage vehicle 6 is possible. In this specific embodiment, the lateral operating console 18 can also be configured as a mobile unit so that an operator can walk next to the intermediate storage vehicle while entering corresponding control commands via the mobile control unit. The mobile unit can be connected to the lateral operating console 18 wirelessly or via a connecting cable.

The other figures show preferred variations and/or further embodiments of the intermediate storage vehicle 6 described in FIG. 1.

Figure 2:
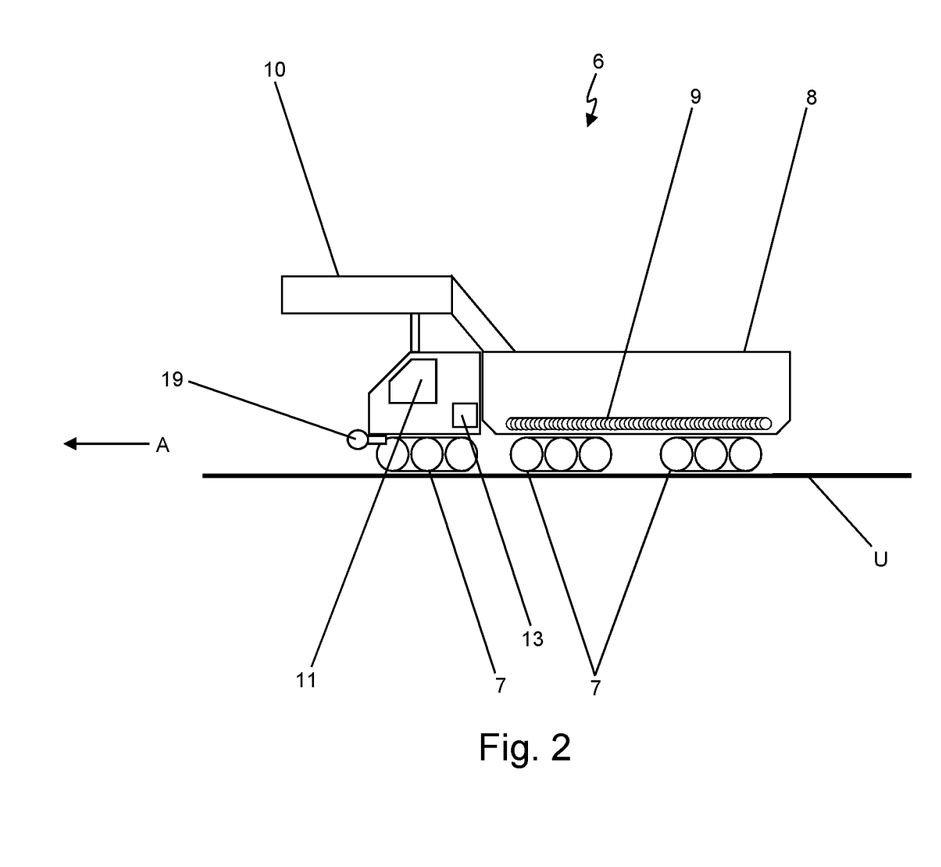
FIG. 2 is a side view of an intermediate storage vehicle according to one embodiment of the present invention.

The intermediate storage vehicle 6 depicted in FIG. 2 is also configured as a self-propelled vehicle and is operated by a machine operator from an operating platform 11. Specifically, the operating platform 11 is a covered driver's cabin with a FOPS and ROPS structure. Here the load transfer conveyor 10 rises above the sidewall of the milled material store 8, extends over the operating platform 11 and ends finally with the discharge end at some distance in front of the operating platform 11. This way a transport vehicle 4 can be positioned with its transport container 5 below the discharge end, while a certain safety distance is nevertheless maintained between the operating platform 11 and the rear end of the transport vehicle 4. The risk of a collision of both vehicles 6, 4 is thus substantially reduced. In the event that the intermediate storage vehicle 6 and the transport vehicle 4 still come into contact with one another, one or more bumper rollers 19 are arranged at the front end of the intermediate storage vehicle 6. These engage with the tires of the transport vehicle 4 in the case of a collision so that the intermediate storage vehicle 6 can then, if necessary, push the transport vehicle 4 forward as well.

Figure 3:
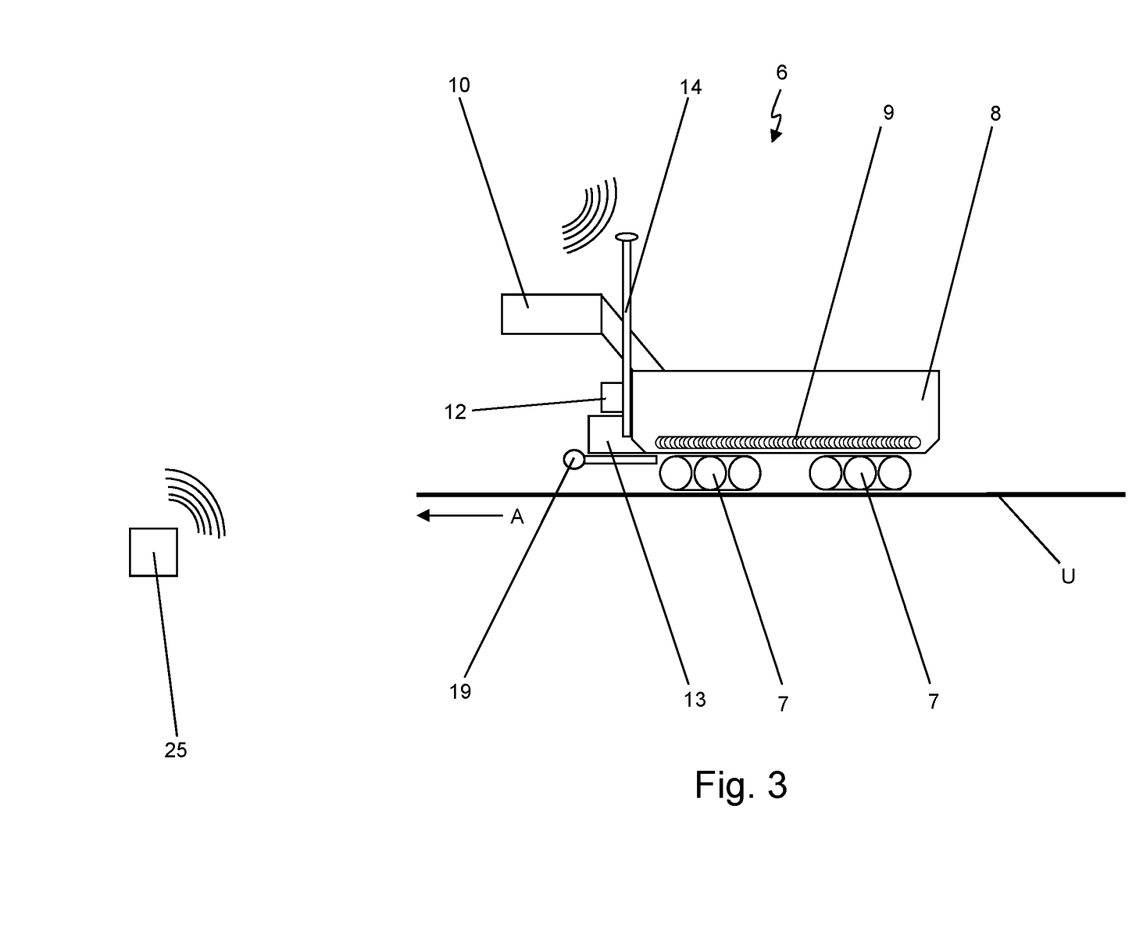
FIG. 3 is a side view of an alternative embodiment of an intermediate storage vehicle according to one embodiment of the present invention without an operating platform.

A variation of the intermediate storage vehicle 6 according to one embodiment of the present invention, which manages without an operating platform, is depicted in FIG. 3. Arranged on the intermediate storage vehicle 6 for this purpose is a control system 12, which can both receive control signals for the intermediate storage vehicle 6 via a receiver of a communication device 14 and implement them in the sense of a remote steering device, as well as automatically generate control signals for the intermediate storage vehicle 6. The control signals are entered, e.g., via the mobile unit 25. The engine 13 in the front area of the intermediate storage vehicle 6 provides for the power of the intermediate storage vehicle 6 and is preferably configured as a combustion engine.

Figure 4:
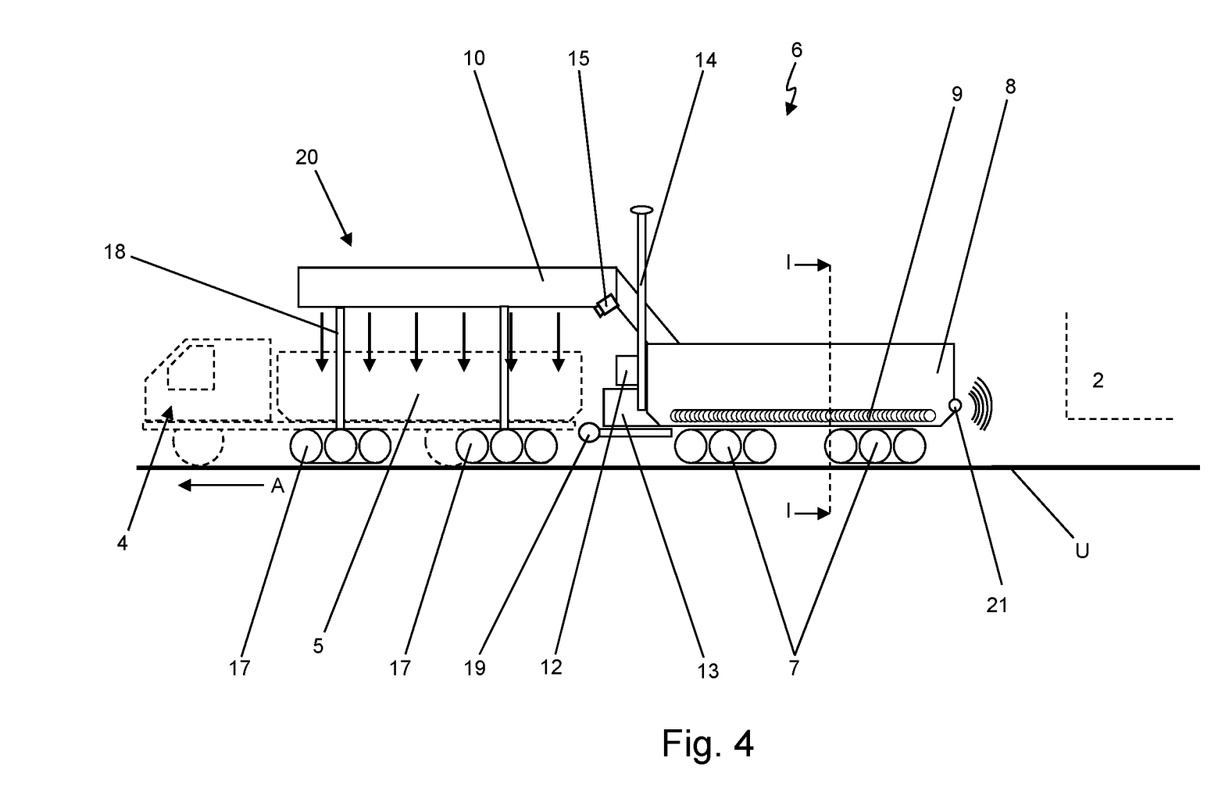
FIG. 4 is a side view of an additional alternative embodiment of an intermediate storage vehicle according to one embodiment of the present invention with accompanying loading station.

An essential difference of the embodiment shown in FIG. 4 lies in the fact that the intermediate storage vehicle 6 comprises a load transfer station 20. Compared with the previous load transfer conveyors 10, the load transfer station 20 projects much further beyond the front end of the milled material store 8 so that nearly the entire transport container 5 of the transport vehicle 4 can be positioned in its entire length under the load transfer station 20. An extremely fast and even loading of the transport vehicle 4 with milled material from above (arrows in FIG. 4) is possible with the help of the load transfer station 20.

The load transfer station 20 further has its own chassis 17 and can be mounted on or removed from the intermediate storage vehicle 6 of FIG. 4, as needed, in particular also as an autonomous module.

Furthermore, a sensor arrangement 15, configured as a camera in the example, is arranged here on the intermediate storage vehicle 6, specifically at an end of the load transfer conveyor 10 located near the discharge point. This sensor arrangement 15 is connected to the control unit 12 and arranged so that the contents or fill level of the transport container 5 of the transport vehicle 4 can be determined with the sensor arrangement 15. Camera images obtained in this manner can be evaluated with the help of the control unit 12 so that the combination of the control unit 12 and the sensor arrangement 15 is suitable, e.g., for measuring the fill level of the transport container 5 or for determining a geometry of the surface of the milled material in the transport container 5. The measurement results obtained in this manner can also be transmitted to the other vehicles 4, 2 in the work train 1 by means of the communication device 14, e.g., in order to provide the operator of the surface milling machine 2 or the driver of the transport vehicle 4 with a better overview of the entire state of the work process. The measurement results can also be used, e.g., to calculate the remaining time for the loading process and to inform a further transport vehicle 4 so that the coordination of the alternating transport vehicles 4 can be improved.

Furthermore, a distance sensor 21 is arranged on the backside of the intermediate storage vehicle 6, e.g., in the form of an ultrasound sensor, camera, etc. A continuous monitoring of the horizontal distance or distance in the working direction A between the intermediate storage vehicle 6 and the surface milling machine 2 driving behind it (only illustrated schematically in FIG. 4) is thus possible. The distance sensors can be part of the control device 12 and, in particular, also be used for the automated distance control of the intermediate storage vehicle 6 to the surface milling machine 2.

Naturally, the previous embodiments of FIGS. 1 to 3 can also comprise these types of sensor systems.

Figure 5A:
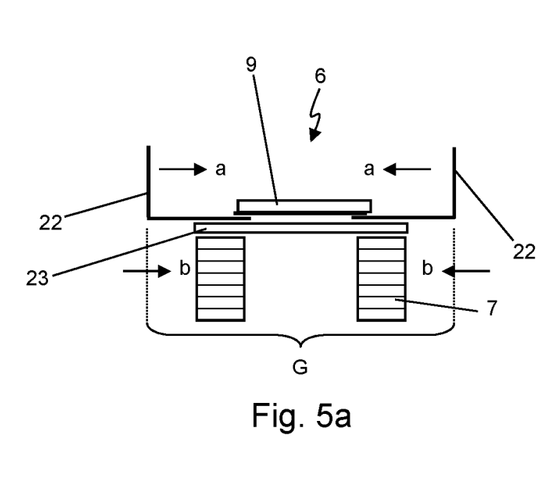
FIG. 5a is a cross-section transverse to the longitudinal axis of an intermediate storage vehicle according to one embodiment of the present invention.
Figure 5B:
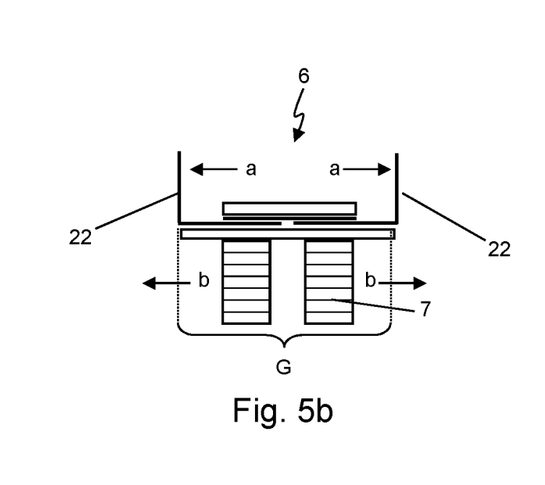
FIG. 5b is the same perspective of the intermediate storage vehicle shown in FIG. 5a in an alternative configuration.
Figure 6A:
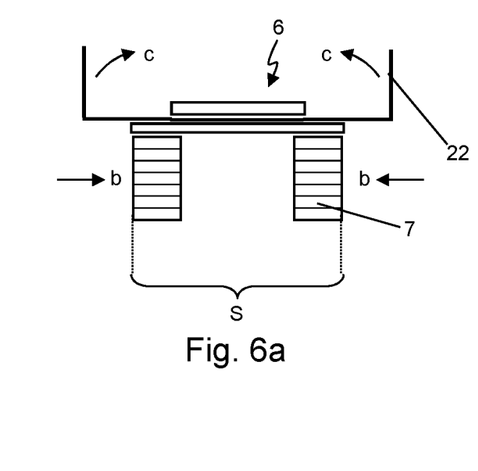
FIG. 6a is a cross-section transverse to the longitudinal axis of an alternative embodiment of an intermediate storage vehicle according to one embodiment of the present invention.
Figure 6B:
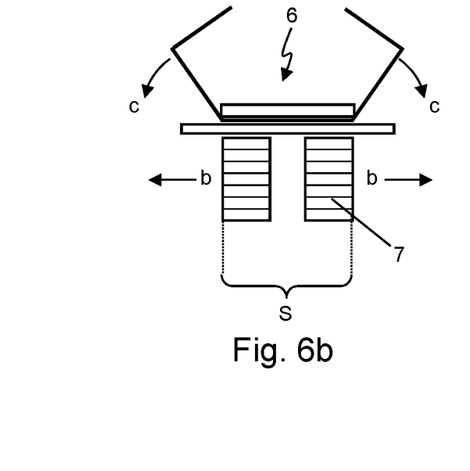
FIG. 6b is the same perspective of the intermediate storage vehicle shown in FIG. 6a in an alternative configuration.

Respectively, FIGS. 5a, 5b, and 6a, 6b schematically represent a cross-section of an embodiment of the intermediate storage vehicle 6, the cross-section being perpendicular to its longitudinal axis, specifically along the section line I-I shown in FIG. 3. In particular, these figures illustrate different possibilities regarding how the track width and the overall width of the intermediate storage vehicle 6 can be, e.g., reduced for transport purposes or increased for work purposes. In this regard, these embodiments differ insofar as the embodiment presented in FIGS. 5a and 5b has a milled material store 8 with slidable (arrow a) sidewalls 22, while the embodiment presented in FIGS. 6a and 6b provides a milled material store 8 with sidewalls that can be tilted or pivoted (arrow b). FIGS. 5a and 6a both show a basic or working position, wherein the running units 7 of the chassis, which can be adjusted with respect to track width, are set to a working track width and the milled material store 8 is in a working configuration. In contrast, FIGS. 5b and 6b both show a transport position in which the total width G of the intermediate storage vehicle 6 is decreased either by moving the sidewalls 22 in a parallel manner inwards (as shown in FIG. 5b) or by pivoting them inwards (as shown in FIG. 6b).

Additionally, or alternatively, the lane width S of the intermediate storage vehicle 6 can also be decreased by moving the running units 7 inwards (arrow c). This way it is possible to ensure that, on the one hand, the intermediate storage vehicle 6 can drive onto a low-bed truck designed for a standard track width and that, on the other hand, it also meets the stipulated road regulation requirements with regard to the maximum total width of a truck approved for use in traffic when loaded with the intermediate storage vehicle 6.

Figure 7:
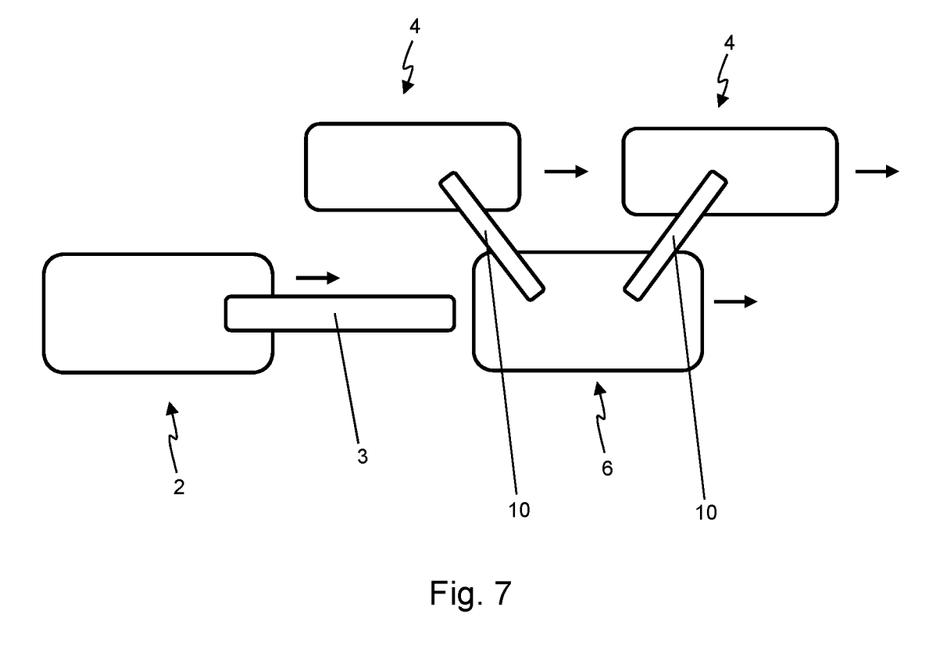
FIG. 7 is a top view of a work train with a surface milling machine, an intermediate storage vehicle and two transport vehicles.

Finally, FIG. 7 illustrates an alternative embodiment of a work train. To begin with, this embodiment is special in that the intermediate storage vehicle simultaneously comprises a total of two load transfer conveyors 10. In this specific embodiment, these are both rotatable about a vertical axis. Both load transfer conveyors can thus be brought into a position relative to one another so that one load transfer conveyor 10 discharges forwards in relation to the direction of travel of the intermediate storage vehicle (arrows in FIG. 7) and the other load transfer conveyor 10 discharges rearwards in relation to the direction of travel of the intermediate storage vehicle. Furthermore, when viewed in the horizontal plane, both load transfer conveyors 10 are swung out to the same side of the intermediate storage vehicle 6, in this specific case to the left side. This arrangement of the work train has several advantages. First, several transport vehicles 4 can be simultaneously loaded by the intermediate storage vehicle 6. Second, several transport vehicles can be positioned on opposite sides or on the same side of the intermediate storage vehicle 6 during the loading process. As a result, in particular an offset positioning of both transport vehicles in relation to the intermediate storage vehicle can be achieved. It is also possible that the transport vehicles are successively loaded first from the first load transfer conveyor of the intermediate storage vehicle and then from the second load transfer conveyor. A particularly efficient loading can occur this way. For example, the transport vehicles can successively slowly drive by the intermediate storage vehicle in a row or be slowly passed by the intermediate storage vehicle and thus each be loaded first by the first load transfer conveyor and then by the second load transfer conveyor. This way, a particularly efficient loading can be achieved.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. An intermediate storage vehicle for storing or transferring milled material, comprising:
   a machine frame;
   a chassis;
   a milled material store;
   an internal conveying device; and
   at least two load transfer conveyors,
   wherein the internal conveying device is configured to transport milled material from the milled material store in a direction of the load transfer conveyors,
   wherein the at least two load transfer conveyors are configured to unload the milled material from the intermediate storage vehicle, and
   further wherein one of the at least two load transfer conveyors is configured to discharge forwards in relation to a direction of travel of the intermediate storage vehicle and another of the at least two load transfer conveyors is configured to discharge rearwards in relation to the direction of travel of the intermediate storage vehicle.

2. The intermediate storage vehicle according to claim 1, wherein at least one of the at least two load transfer conveyors is configured to at least partially protrude from the intermediate storage vehicle.

3. The intermediate storage vehicle according to claim 1, wherein the intermediate storage vehicle comprises a propulsion engine and is configured as a self-propelled vehicle.

4. The intermediate storage vehicle according to claim 1, wherein the vehicle has at least one of the following features:
   the chassis is configured as a crawler track chassis, and/or
   the chassis is configured as a chassis with an adjustable track width.

5. The intermediate storage vehicle according to claim 1, wherein the intermediate storage vehicle comprises an operating platform which has one of the following features:
   the operating platform is arranged on a front side of the intermediate storage vehicle in a working direction, and/or
   the operating platform is configured as a driver's cabin.

6. The intermediate storage vehicle according to claim 1, wherein the milled material store has at least one of the following features:
   the milled material store comprises a floor and is configured to be open towards the top,
   the milled material store has a variable receiving volume via sidewalls that can be pivoted or slid inwards in a direction toward each other from an operating position to a transport position, whereby a total width of the intermediate storage vehicle decreases,
   at least one of the sidewalls of the milled material store is at least partially height-adjustable, and/or
   the milled material store has a load capacity of at least 7.5 tons.

7. The intermediate storage vehicle according to claim 6, wherein the milled material store has a load capacity of at least 15 tons.

8. The intermediate storage vehicle according to claim 6, wherein the milled material store has a load capacity of at least 22.5 tons.

9. The intermediate storage vehicle according to claim 1, wherein the internal conveying device has at least one of the following features:
   the internal conveying device is configured to deliver the milled material to the at least two load transfer conveyors,
   the internal conveying device is arranged on a floor of the milled material store,
   the internal conveying device is arranged below the floor of the milled material store so that milled material reaches the internal conveyor from the milled material store,
   the internal conveying device is configured as a screw conveyor, and/or
   the internal conveying device is configured as a scraper floor or scraper belt.

10. The intermediate storage vehicle according to claim 1, wherein at least one of the at least two load transfer conveyors has at least one of the following features:
    at least one of the at least two load transfer conveyors is configured as a belt conveyor, at least one of the at least two load transfer conveyors is configured in a segmented manner, comprising at least two conveyor segments, at least one of the at least two load transfer conveyors is height-adjustable so that a height of a discharge point can be varied, at least one of the at least two load transfer conveyors can be pivoted to the sides from a central position so that a lateral deflection of a discharge point can be varied, a conveying speed of at least one of the at least two load transfer conveyors is modifiable so that a discharge range of the at least one load transfer conveyor can be varied, at least one of the at least two load transfer conveyors is configured in structural union with a sidewall of the milled material store, and/or the intermediate storage vehicle comprises an accompanying loading station for a transport vehicle and at least one of the at least two load transfer conveyors is integrated in the loading station.

11. The intermediate storage vehicle according to claim 1, wherein the intermediate storage vehicle has at least one of the following features for operation:

the intermediate storage vehicle is configured to be remote-controlled with respect to direction, speed, operation of the internal conveying device and/or at least one of the at least two load transfer conveyors, the intermediate storage vehicle comprises at least one external operating console for entering commands regarding direction and/or speed and/or tasks, and/or the intermediate storage vehicle comprises a distance control system for monitoring and/or controlling the distance to a surface milling machine and/or a transport vehicle.

12. The intermediate storage vehicle according to claim 1, wherein the intermediate storage vehicle has a pushing device in a forward direction with which the intermediate storage vehicle can push a transport vehicle during a load transfer process.

13. A work train for milling ground material at a milling depth, comprising:

a surface milling machine with a milling device and a conveying device for transferring the material milled by the milling device, a transport vehicle comprising a transport container and with which the milled material is transported away, and an intermediate storage vehicle according to claim 1, which is loaded via the conveying device by the surface milling machine and in turn loads the transport vehicle.

14. The work train according to claim 13, wherein the work train comprises a control system, which controls, regulates, and monitors the relative positions of the surface milling machine and the intermediate storage vehicle, and has at least one of the following features:

the control system is configured to automatically control or regulate a distance between the surface milling machine and the intermediate storage vehicle so that this distance remains constant, the control system is configured to adapt a speed of travel of the intermediate storage vehicle to a working speed of the surface milling machine, and/or the control system is configured to control a position of the discharge point of at least one of the at least two load transfer conveyors of the intermediate storage vehicle in relation to the position of the transport container of the transport vehicle during a load transfer process according to a previously defined target distribution of the milled material in the transport container of the transport vehicle or a previously defined target surface geometry of the milled material in the transport container of the transport vehicle.

15. The work train according to claim 14, wherein the control system comprises a sensor arrangement, wherein the sensor arrangement has at least one of the following features:

the sensor arrangement comprises a distance sensor, the sensor arrangement comprises a camera, the sensor arrangement is configured to determine a distance between the intermediate storage vehicle and the surface milling machine or the transport vehicle, the sensor arrangement is configured to determine the position of the intermediate storage vehicle in relation to the surface milling machine or in relation to the transport vehicle, the sensor arrangement is configured to determine the position of the transport container of the transport vehicle in relation to a discharge point of at least one of the at least two load transfer conveyors of the intermediate storage vehicle, the sensor arrangement is configured to determine a fill level of the transport container of the transport vehicle, and/or the sensor arrangement is configured to determine a distribution of the milled material in the transport container of the transport vehicle or a surface geometry of the milled material in the transport container of the transport vehicle.

16. The work train according to claim 13, wherein a load capacity of the intermediate storage vehicle is at least 1.5 times a load capacity of the transport vehicle.

17. The work train according to claim 13, wherein a load capacity of the intermediate storage vehicle is at least twice a load capacity of the transport vehicle.

18. The work train according to claim 13, wherein a load capacity of the intermediate storage vehicle is at least 2.5 times a load capacity of the transport vehicle.

19. The intermediate storage vehicle according to claim 1, wherein the load transfer conveyors are configured to simultaneously unload the milled material from the intermediate storage vehicle.

* * * * *